US012115468B1

(12) United States Patent
Sun et al.

(10) Patent No.: US 12,115,468 B1
(45) Date of Patent: Oct. 15, 2024

(54) ON-LINE DEGASSING DEVICE FOR FLOWING LIQUID

(71) Applicant: SHANGHAI SHENGTUO MEDICAL APPARATUS CO., LTD., Shanghai (CN)

(72) Inventors: Chenggang Sun, Shanghai (CN); Zhengxi Mi, Shanghai (CN)

(73) Assignee: Shanghai Shengtuo Medical Apparatus Co., LTD., Shanghai (CN)

( * ) Notice: Subject to any disclaimer, the term of this patent is extended or adjusted under 35 U.S.C. 154(b) by 0 days.

(21) Appl. No.: 18/613,736

(22) Filed: Mar. 22, 2024

Related U.S. Application Data

(63) Continuation of application No. PCT/CN2024/078249, filed on Feb. 23, 2024.

(30) Foreign Application Priority Data

May 9, 2023 (CN) .......................... 202321111603.X

(51) Int. Cl.
*B01D 19/00* (2006.01)
(52) U.S. Cl.
CPC ................ *B01D 19/0036* (2013.01)
(58) Field of Classification Search
CPC .............. B01D 19/0036; B01D 19/00
See application file for complete search history.

(56) References Cited

FOREIGN PATENT DOCUMENTS

| CN | 205982193 U | * | 2/2017 | ............. C01N 30/02 |
| CN | 210543516 U | * | 5/2020 | ............. B01D 19/02 |
| CN | 218944423 U | * | 5/2023 | ............. B01D 19/00 |

OTHER PUBLICATIONS

CN-205982193-U_English translation (Year: 2017).*
CN-210543516-U_English translation (Year: 2020).*
CN-218944423-U_English translation (Year: 2023).*

* cited by examiner

*Primary Examiner* — Youngsul Jeong
(74) *Attorney, Agent, or Firm* — Edell, Shapiro, & Finnan, LLC

(57) ABSTRACT

An on-line degassing device for flowing liquid is provided, belonging to the technical field of on-line degassers of mobile phase. The device includes a main body which is internally provided with a degassing chamber. The main body is provided with a maintenance port and a vacuum joint for being connected to a vacuumizing apparatus. The vacuum joint and the maintenance port both communicate with the degassing chamber, a sealing end cover is detachably connected to the maintenance port, and a degassing pipe is provided in the degassing chamber. A liquid inlet positioning joint and a liquid outlet positioning joint for respectively fixing a liquid inlet end and a liquid outlet end of the degassing pipe are detachably connected to the end face, facing the maintenance port, of the sealing end cover.

10 Claims, 4 Drawing Sheets

ON-LINE DEGASSING DEVICE FOR FLOWING LIQUID

CROSS REFERENCE TO RELATED APPLICATIONS

This patent application is a continuation of International Patent Application No. PCT/CN2024/078249, filed on Feb. 23, 2024, which claims the benefit and priority of Chinese Patent Application No. 202321111603X filed on May 9, 2023, the disclosures of which are incorporated herein by reference in their entireties.

TECHNICAL FIELD

The present disclosure relates to the technical field of mobile phase on-line degassers, in particular to an on-line degassing device for flowing liquid.

BACKGROUND

When there are bubbles in a liquid flow path in the liquid phase analyzer, optical signals detected by the liquid phase analyzer are affected, resulting in a series of problems such as distortion of analysis results, increase of noise and baseline drift, etc. Therefore, the performance of the liquid phase analyzer can be improved by removing or reducing liquid bubbles in the flow path. To this end, a mobile phase on-line degasser is usually used to degas each liquid. The mobile phase on-line degasser usually adopts a negative-pressure chamber degassing method, that is, a degassing pipe made of a breathable material is fixed into a relatively sealed chamber, and an air extraction device is connected outside the chamber to make the chamber reach a vacuum environment through continuous air extraction, thus generating a negative pressure to achieve the degassing effect, such as "Ultrasonic degassing device for liquid chromatograph" disclosed in the US201620957667.5. However, as a main component for degassing, the degassing pipe is the most vulnerable place of the whole device, which is easy to be damaged with continuous use. But the degassing pipe of the current degassing device is fixed in a chamber of the degassing device, which is inconvenient to replace.

SUMMARY

An objective of the present disclosure is to provide an on-line degassing device for flowing liquid to solve the technical problem above. When the sealing end cover is removed, the degassing pipe can be pulled out of the degassing chamber together, and then the liquid inlet positioning joint and the liquid outlet positioning joint are removed to facilitate the replacement of the degassing pipe. Compared with a traditional degasser that the degassing pipe is fixed in the degassing chamber, the maintenance and replacement of the degassing pipe of the device are simpler.

To achieve the objective above, the present disclosure provides the following solutions: an on-line degassing device for flowing liquid includes a main body internally provided with a degassing chamber. The main body is provided a maintenance port and a vacuum joint for being connected to a vacuum pumping device. The vacuum joint and the maintenance port both communicate with the degassing chamber, a sealing end cover is detachably connected to the maintenance port, and a degassing pipe made of a breathable material is provided in the degassing chamber. A liquid inlet positioning joint and a liquid outlet positioning joint for respectively fixing a liquid inlet end and a liquid outlet end of the degassing pipe are detachably connected to an end face, facing the maintenance port, of the sealing end cover. A liquid inlet port and a liquid outlet port respectively communicating with the liquid inlet positioning joint and the liquid outlet positioning joint are provided on an end face, away from the maintenance port, of the sealing end cover.

Preferably, the sealing end cover is connected to the maintenance port by screws.

Preferably, the end face, facing the maintenance port, of the sealing end cover is provided with a liquid inlet groove and a liquid outlet groove for respective threaded connection of the liquid inlet positioning joint and the liquid outlet positioning joint, and a groove bottom of each of the liquid inlet groove and the liquid outlet groove is provided with a guide channel. The guide channel of the liquid inlet groove communicates with the liquid inlet port, and the guide channel of the liquid outlet groove communicates with the liquid outlet port. The liquid inlet end and the liquid outlet end of the degassing pipe respectively extend into the guide channel of the liquid inlet groove and the guide channel of the liquid outlet groove.

Preferably, a sealing plug is provided at the groove bottom of each of the liquid inlet groove and the liquid outlet groove, and a pipeline passage hole is formed in the sealing plug.

Preferably, the end face, facing the maintenance port, of the sealing end cover is provided with a sealing protrusion for being hermetically inserted into the maintenance port.

Preferably, the sealing protrusion is sleeved with a sealing ring.

Preferably, the end face, facing the maintenance port, of the sealing end cover is provided with a communicating groove capable of communicating with the maintenance port, multiple degassing chambers spaced at an interval in an extending direction of the communicating groove are provided in the main body, and the vacuum joint communicates with one of the degassing chambers.

Preferably, the communicating groove is a vertically arranged strip groove, the liquid inlet positioning joint and the liquid outlet positioning joint are separately provided at both sides of the strip groove and are located in a same horizontal plane, and the vacuum joint communicates with one of the degassing chambers closest to a top of the main body.

Preferably, the degassing pipe includes a winding part, with a height in fit with a thickness of the winding part.

Preferably, the winding part may be wound into a cylinder, a disk, a cone, or a square.

Compared with the prior art, the present disclosure has the following technical effects:

1. In the on-line degassing device for flowing liquid disclosed by the present disclosure, the liquid inlet end and the liquid outlet end of the degassing pipe are connected to the sealing end cover through the liquid inlet positioning joint and the liquid outlet positioning joint, respectively. When the sealing end cover is removed, the degassing pipe can be pulled out of the degassing chamber together, and then the liquid inlet positioning joint and the liquid outlet positioning joint are removed to facilitate the replacement of the degassing pipe. Compared with a traditional degasser that the degassing pipe is fixed in the degassing chamber, the maintenance and replacement of the degassing pipe of the device are very convenient.

2. The groove bottom of each of the liquid inlet groove and the liquid outlet groove is provided with a sealing plug, which not only can improve the stability of the degassing pipe, but also can improve the sealing performance, thus preventing outside gas from entering the degassing chamber through the liquid inlet positioning joint and the liquid outlet positioning joint.

3. After the sealing protrusion on the sealing end cover is inserted into the maintenance port, a contact area between the sealing protrusion and the maintenance port can be increased, which in turn improves the sealing effect.

4. In the present disclosure, the sealing protrusion is sleeved with a sealing ring. After the sealing end cover is connected to the main body, the sealing ring can be pressed between the sealing end cover and the main body, the deformation of the sealing ring can seal a gap between the sealing end cover and the maintenance port, thus improving the sealing effect.

5. Multiple degassing chambers are provided in the main body, the degassing chambers communicate with each other through the communicating groove on the sealing end cover, all the degassing chambers can be vacuumized through one vacuum joint, and then multiple groups of liquids can be degassed simultaneously through the degassing pipes in the multiple degassing chambers.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
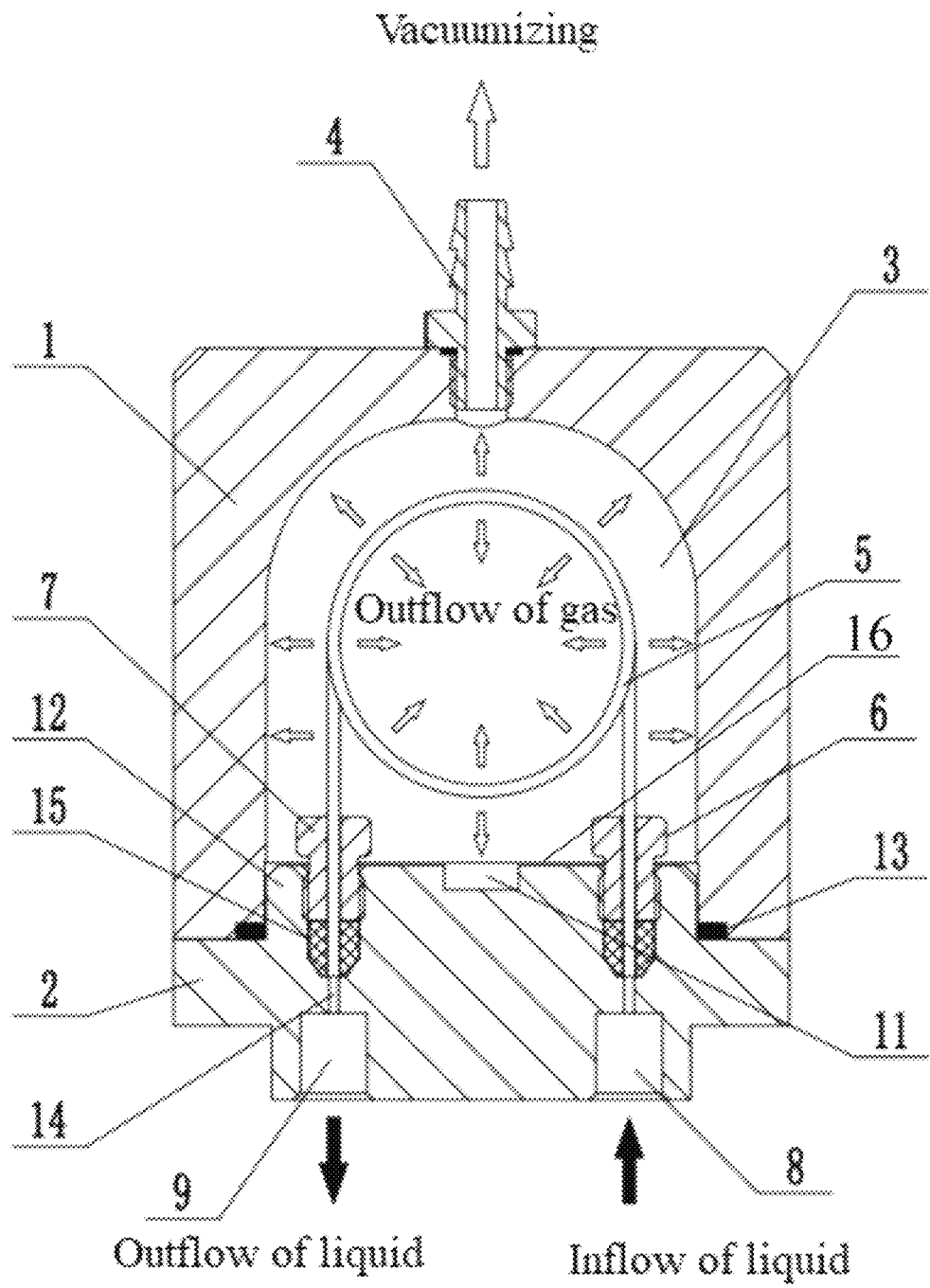
FIG. 1 is a sectional view of an on-line degassing device for flowing liquid in a width direction.

In the drawings: 1—main body; 2—sealing the end cover; 3—degassing chamber; 4—vacuum joint; 5—degassing pipe; 6—liquid inlet positioning joint; 7—liquid outlet positioning joint; 8—liquid inlet; 9—liquid outlet; 10—screw; 11—communicating groove; 12—sealing protrusion; 13—sealing ring; 14—guide channel; 15—sealing plug; maintenance port 16.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiment provides an on-line degassing device for flowing liquid, as shown from FIG. 1 to FIG. 4, including a main body 1 and a sealing end cover 2. The main body 1 is provided with a maintenance port 16 and a vacuum joint 4, and the vacuum joint 4 is used for being connected to a vacuumizing apparatus. The main body 1 is internally provided with a degassing chamber 3, the number of the degassing chamber 3 may be one or more, and the providing of multiple degassing chambers can simultaneously degas a variety of liquids. The vacuum joint 4 and the maintenance port 16 both communicate with the degassing chamber 3, and a degassing pipe 5 made of a breathable material is provided in the degassing chamber 3. The sealing end cover 2 is detachably connected to the maintenance port 16, and a liquid inlet positioning joint 6 and a liquid outlet positioning joint 7 are detachably connected to an end face, facing the maintenance port 16, of the sealing end cover 2. The liquid inlet positioning joint 6 and the liquid outlet positioning joint 7 are used to fix a liquid inlet end and a liquid outlet end of the degassing pipe 5, respectively. An end face, away from the maintenance port 16, of the sealing end cover 2 is provided with a liquid inlet 8 and a liquid outlet 9 in communication with the liquid inlet positioning joint 6 and the liquid outlet positioning joint 7, respectively. As the liquid inlet end and the liquid outlet end of the degassing pipe 5 are connected to the sealing end cover 2 through the liquid inlet positioning joint 6 and the liquid outlet positioning joint 7, when the sealing end cover 2 is removed, the degassing pipe 5 can be separated from the main body 1 together, and then the liquid inlet positioning joint 6 and the liquid outlet positioning joint 7 can be removed to facilitate the replacement of the degassing pipe 5, thus facilitating the maintenance. The liquid inlet positioning joint 6 and the liquid outlet positioning joint 7 are both provided with positioning through holes for fixing the liquid inlet end and the liquid outlet end of the degassing pipe 5. The device can be used in a liquid phase analyzer to degas the liquid in the liquid phase analyzer.

The operating principle of the device is as follows:

The vacuum joint 4 is connected to the vacuumizing apparatus, then the vacuumizing apparatus is started to vacuumize the degassing chamber 3. Liquid is introduced into the liquid inlet 8, and enters the degassing pipe 5 from the liquid inlet end of the degassing pipe 5, and then is discharged from the liquid outlet end of the degassing pipe 5 and the liquid outlet 9. Under a negative pressure environment in the degassing chamber, the liquid flowing in the degassing pipe 5 continuously escapes from a pipe wall of the degassing pipe 5, and is pumped into the vacuumizing apparatus along the vacuum joint 4, and then completes liquid degassing.

In this embodiment, as shown from FIG. 1 to FIG. 4, the sealing end cover 2 is connected to the maintenance port 16 by screws 10. The sealing end cover 2 can be separated from the main body 1 after the screws 10 are removed.

In this embodiment, as shown from FIG. 1 to FIG. 4, the end face, facing the maintenance port 16, of the sealing end cover 2 is provided with a liquid inlet groove and a liquid outlet groove. The liquid inlet positioning joint 6 is threaded into the liquid inlet groove, and the liquid outlet positioning joint 7 is threaded into the liquid outlet groove. A groove bottom of each of the liquid inlet groove and the liquid outlet groove is provided with a guide channel 14, the guide channel 14 of the liquid inlet groove communicates with the liquid inlet 8, and the guide channel 14 of the liquid outlet groove communicates with the liquid outlet 9. The liquid inlet end of the degassing pipe 5 connected to the liquid inlet positioning joint 6 extends into the guide channel 14 of the liquid inlet groove, thereby communicating with the liquid inlet 8. The liquid outlet end of the degassing pipe 5 connected to the liquid outlet positioning joint 7 extends into the guide channel 14 of the liquid outlet groove, thereby communicating with the liquid outlet 9. After the sealing end cover 2 is removed from the main body 1, the liquid inlet positioning joint 6 and the liquid outlet positioning joint 7 can be removed through screwing, and then the liquid inlet end and the liquid outlet end of the degassing pipe 5 can be respectively pulled out from the positioning through holes of the liquid inlet positioning joint 6 and the liquid outlet positioning joint 7, and thus the degassing pipe 5 can be replaced.

In this embodiment, as show in FIG. 1 to FIG. 4, a sealing plug 15 is arranged at the groove bottom of each of the liquid inlet groove and the liquid outlet groove, and a pipeline passage hole is formed in the sealing plug 15, allowing the liquid inlet end and the liquid outlet end of the degassing pipe 5 to pass through. The sealing plug 15, on the one hand, can stabilize the liquid inlet end and the liquid outlet end of the degassing pipe 5, and on the other hand, can improve the sealing performance, thus preventing the outside gas from entering the degassing chamber 3 from the liquid inlet groove and the liquid outlet groove. Preferably, the groove bottom of each of the liquid inlet groove and the liquid outlet groove is conical, and the sealing plug 15 is a conical plug.

In order to improve the sealing performance between the sealing end cover 2 and the maintenance port 16, in this embodiment, as shown from FIG. 1 to FIG. 4, the end face, facing the maintenance port 16, of the sealing end cover 2 is provided with a sealing protrusion 12. The sealing protrusion 12 can be hermetically inserted into the maintenance port 16, and a peripheral wall of the sealing protrusion 12 can be attached to the maintenance port 16, thereby improving the sealing performance.

In order to further improve the sealing performance between the sealing protrusion 12 and the maintenance port 16, in this embodiment, as shown from FIG. 1 to FIG. 4, the sealing protrusion 12 is sleeved with a sealing ring 13. After the sealing protrusion 12 is inserted into the maintenance port 16, and the sealing end cover 2 and the main body 1 are screwed tightly by the screws 10, and the sealing end cover 2 can press the sealing ring 13 between the sealing end cover and the main body 1, further sealing a gap between the sealing protrusion 12 and the maintenance port 16, and improving the sealing performance.

Figure 2:
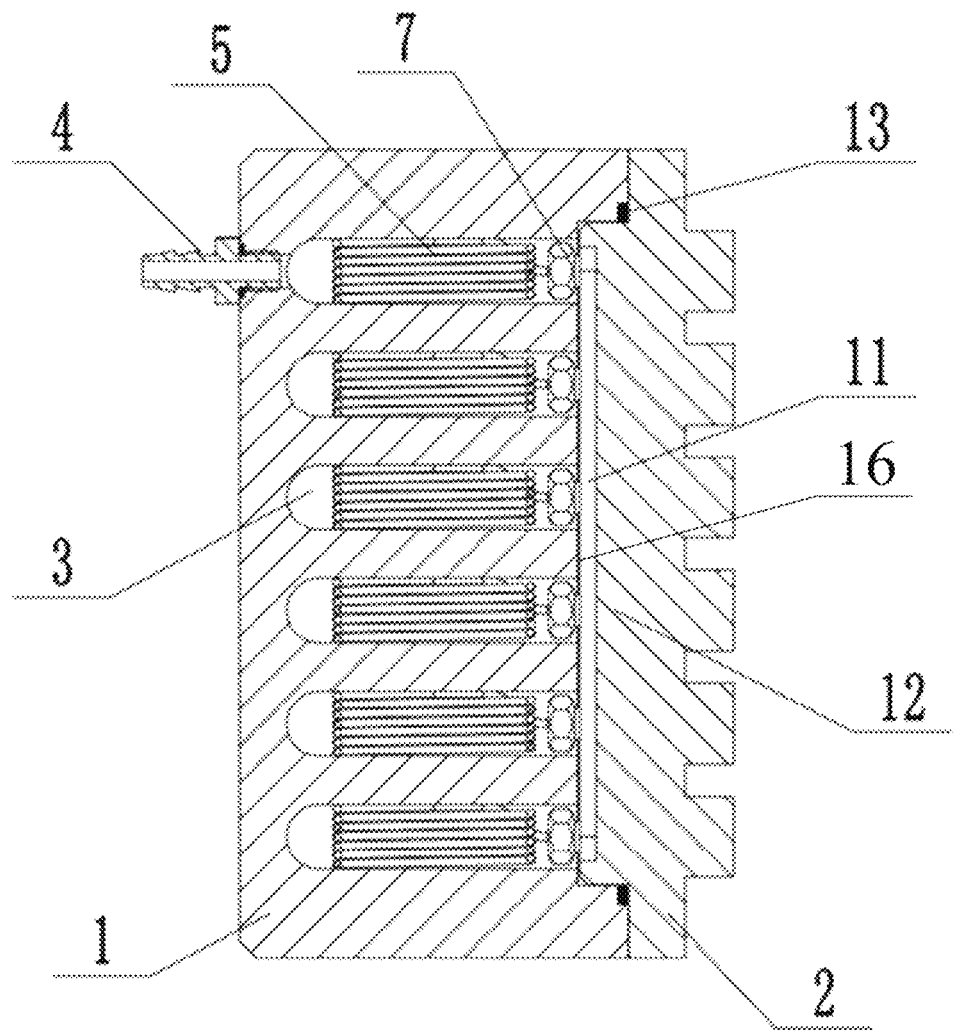
FIG. 2 is a sectional view of an on-line degassing device for flowing liquid in a length direction.
Figure 3:
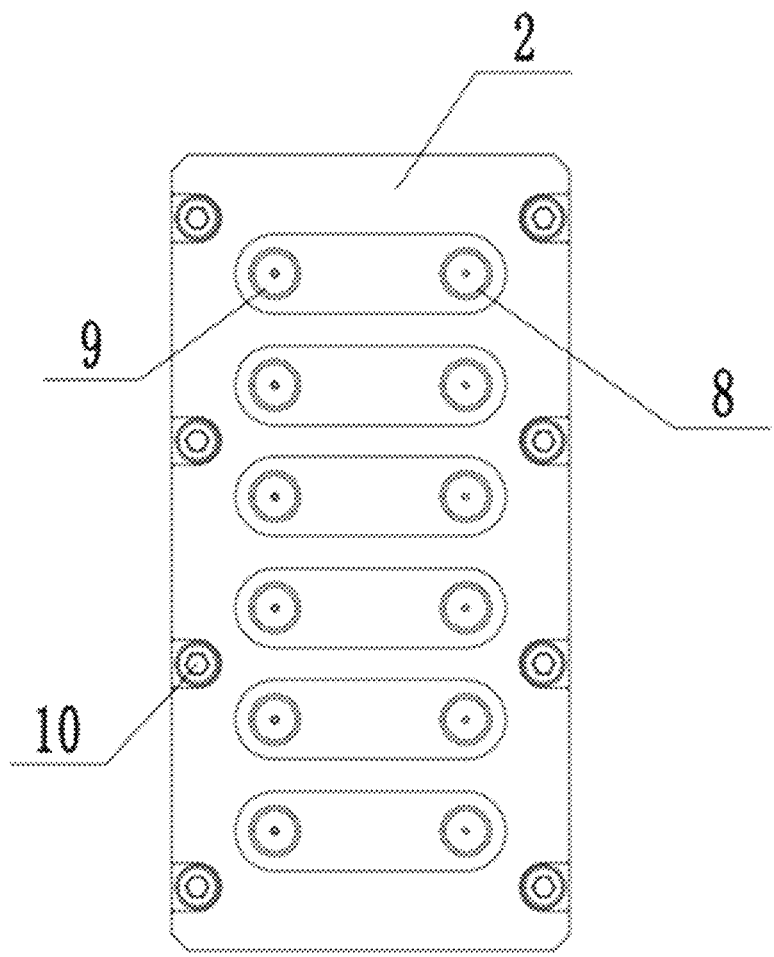
FIG. 3 is a front view of an on-line degassing device for flowing liquid.
Figure 4:
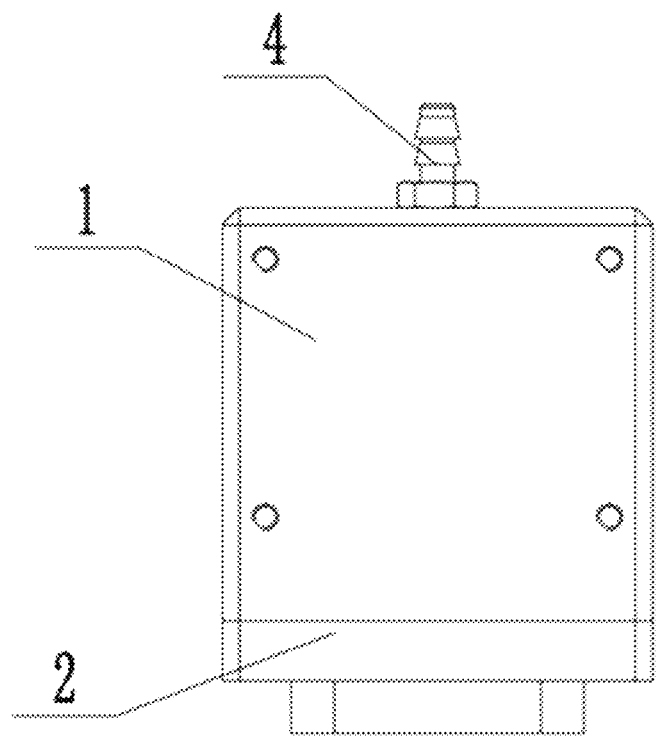
FIG. 4 is a top view of an on-line degassing device for flowing liquid.

In this embodiment, as shown from FIG. 1 to FIG. 4, the end face, facing the maintenance port 16, of the sealing end cover 2 is provided with a communicating groove 11. Multiple degassing chambers 3 are arranged in the main body 1, and the multiple degassing chambers 3 are spaced in an extending direction of the communicating groove 11. When the sealing protrusion 12 is inserted into the maintenance port 16, the communicating groove 11 can communicate with the maintenance port 16, and then communicate with each degassing chamber 3. The vacuum joint 4 communicates with one of the degassing chambers 3. When the vacuum joint 4 is connected to the vacuumizing apparatus, the vacuumizing apparatus is started, and the vacuum joint 4 is used for vacuumizing of the degassing chamber 3 connected thereto. Due to the existence of the communicating groove 11, the gas in the remaining degassing chambers 3 may enter the degassing chamber 3 connected to the vacuum joint 4 one after another through the communicating groove 11, there is no need to provide one vacuum joint 4 for each degassing chamber 3, and thus the cost is saved. As shown in FIG. 2 and FIG. 3, an on-line degassing device for flowing liquid provided with six degassing chambers 3 is provided, which can be used to degas six types of liquids at the same time. Certainly, the number of the degassing chambers 3 is not limited to six, which may be seven, eight or more.

In this embodiment, as shown from FIG. 1 to FIG. 4, the communicating groove 11 is a vertically arranged strip groove, and the liquid inlet positioning joint 6 and the liquid outlet positioning joint 7 are arranged at both sides of the strip groove and are located in the same horizontal plane as the liquid inlet positioning joint 6 and the liquid outlet positioning joint 7. This means that multiple degassing chambers 3 are vertically arranged in the main body 1, each of which corresponds to a liquid inlet positioning joint 6 and a liquid outlet positioning joint 7, and the vacuum joint 4 communicates with the degassing chamber 3 at the top. As shown in FIG. 2 and FIG. 3, the main body 1 needs to be used upright when the device is in use, that is, the vacuum joint 4 is located at the top. Certainly, the device can be used lying flat.

In this embodiment, as shown from FIG. 1 to FIG. 4, the degassing pipe 5 includes a winding part, and the height of the degassing chamber 3 is in fit with the thickness of the winding part, such that the degassing chamber 3 can limit the winding part of the degassing pipe 5 up and down to reduce the vibration caused by the liquid flowing in the degassing pipe 5 and ensure the service life of the degassing pipe 5. The winding part is formed by winding the degassing pipe 5, which can improve the whole length of the degassing pipe 5, thus ensuring that the flowing liquid can be thoroughly degassed when flowing through the degassing pipe 5, and ensuring the degassing effect.

In this embodiment, as shown from FIG. 1 to FIG. 4, the winding part may be wound into a cylinder, a disk, a cone, or a square.

In this embodiment, as shown from FIG. 1 to FIG. 4, a teflon AF degassing membrane tube, such as a teflon AF-2400 tube, is adopted in the degassing pipe 5, which has good air permeability.

In this embodiment, as shown from FIG. 1 to FIG. 4, if a suction pipe of the vacuumizing apparatus is a hose, the vacuum joint 4 can employ a pagoda joint.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed:

1. An on-line degassing device for flowing liquid, comprising:
   a main body internally provided with a degassing chamber, wherein the main body is provided with a vacuum joint for being connected to a vacuum pumping device, and a maintenance port; the vacuum joint and the maintenance port both communicate with the degassing chamber, a sealing end cover is detachably connected to the maintenance port, and a degassing pipe made of a breathable material is provided in the degassing chamber; and
   a liquid inlet positioning joint and a liquid outlet positioning joint for respectively fixing a liquid inlet end and a liquid outlet end of the degassing pipe are detachably connected to an end face, facing the maintenance port, of the sealing end cover, and a liquid inlet port and a liquid outlet port respectively communicating with the liquid inlet positioning joint and the liquid outlet positioning joint are provided on an end face, away from the maintenance port, of the sealing end cover.

2. The on-line degassing device for flowing liquid according to claim 1, wherein the sealing end cover is connected to the maintenance port by screws.

3. The on-line degassing device for flowing liquid according to claim 1, wherein the end face, facing the maintenance port, of the sealing end cover is provided with a liquid inlet groove and a liquid outlet groove for respective threaded connection of the liquid inlet positioning joint and the liquid outlet positioning joint, and a groove bottom of each of the liquid inlet groove and the liquid outlet groove is provided with a guide channel, the guide channel of the liquid inlet groove communicates with the liquid inlet port, the guide channel of the liquid outlet groove communicates with the liquid outlet port, and the liquid inlet end and the liquid outlet end of the degassing pipe respectively extend into the guide channel of the liquid inlet groove and the guide channel of the liquid outlet groove.

4. The on-line degassing device for flowing liquid according to claim 3, wherein a sealing plug is provided at the groove bottom of each of the liquid inlet groove and the liquid outlet groove, and a pipeline passage hole is formed in the sealing plug.

5. The on-line degassing device for flowing liquid according to claim 4, wherein the end face, facing the maintenance port, of the sealing end cover is provided with a sealing protrusion for being hermetically inserted into the maintenance port.

6. The on-line degassing device for flowing liquid according to claim 5, wherein the sealing protrusion is sleeved with a sealing ring.

7. The on-line degassing device for flowing liquid according to claim 1, wherein the end face, facing the maintenance port, of the sealing end cover is provided with a communicating groove capable of communicating with the maintenance port, a plurality of degassing chambers spaced at an interval in an extending direction of the communicating groove are provided in the main body, and the vacuum joint communicates with one of the degassing chambers.

8. The on-line degassing device for flowing liquid according to claim 7, wherein the communicating groove is a vertically arranged strip groove, the liquid inlet positioning joint and the liquid outlet positioning joint are separately provided at both sides of the strip groove and are located in a same horizontal plane, and the vacuum joint communicates with one of the degassing chambers closest to a top of the main body.

9. The on-line degassing device for flowing liquid according to claim 8, wherein the degassing pipe comprises a winding part, and a height of the degassing chamber is in fit with a thickness of the winding part.

10. The on-line degassing device for flowing liquid according to claim 9, wherein the winding part is wound into a cylinder, a disk, a cone, or a square.

\* \* \* \* \*